(12) United States Patent
Campanella et al.

(10) Patent No.: US 11,846,710 B2
(45) Date of Patent: Dec. 19, 2023

(54) MOTOR VEHICLE PROVIDED WITH ANTI-COLLISION SENSORS

(71) Applicants: PSA AUTOMOBILES SA, Poissy (FR); EASYMILE, Toulouse (FR)

(72) Inventors: Thierry Campanella, Linas (FR); Blandine Hillairet, Rueil Malmaison (FR); Celine Etcheverry, Verrieres le Buisson (FR); Vincent Scesa, Miremont (FR)

(73) Assignee: PSA AUTOMOBILES SA, Poissy (FR)

( * ) Notice: Subject to any disclaimer, the term of this patent is extended or adjusted under 35 U.S.C. 154(b) by 642 days.

(21) Appl. No.: 16/972,941

(22) PCT Filed: Jun. 17, 2019

(86) PCT No.: PCT/FR2019/051458
§ 371 (c)(1),
(2) Date: Dec. 7, 2020

(87) PCT Pub. No.: WO2019/243718
PCT Pub. Date: Dec. 26, 2019

(65) Prior Publication Data
US 2021/0247518 A1    Aug. 12, 2021

(30) Foreign Application Priority Data

Jun. 20, 2018 (FR) ...................... 1855424

(51) Int. Cl.
*G01S 17/931* (2020.01)
*G01S 7/481* (2006.01)

(52) U.S. Cl.
CPC .......... *G01S 17/931* (2020.01); *G01S 7/4813* (2013.01); *G01S 7/4815* (2013.01); *G01S 7/4817* (2013.01)

(58) Field of Classification Search
CPC .... G01S 17/931; G01S 7/4815; G01S 7/4813; G01S 7/4817; G01S 17/87
(Continued)

(56) References Cited

U.S. PATENT DOCUMENTS

2018/0059662 A1    3/2018  Sato et al.
2018/0136644 A1    5/2018  Levinson et al.

FOREIGN PATENT DOCUMENTS

EP         3081959 A1    10/2016
WO      2017060977 A1     4/2017

OTHER PUBLICATIONS

International Search Report for PCT/FR2019/051458 dated Sep. 20, 2019.
(Continued)

*Primary Examiner* — Daniel L Murphy
(74) *Attorney, Agent, or Firm* — Sandberg Phoenix & von Gontard, PC

(57) ABSTRACT

A motor vehicle is provided with at least four identical lidar-type anti-collision sensors (C1 to C4) respectively arranged on the four corners of the vehicle, each sensor (C1 to C4) having the same predetermined opening angle (θ) and defining at least one detection area around the vehicle (VP), with certain detection areas (ZR2, ZR3) overlapping in order to create redundancy, wherein the two left and right front sensors (C1 and C2) are positioned and oriented such that their respective detection areas are tangential to the offset (D1, D2) of the front left and right wheels (RA1, RA2), respectively, taking into account the maximum steering angle of the front left and right wheels (RA1, RA2), and wherein the two rear left and right sensors (C3 and C4) define detection areas (ZR0) that do not overlap with other detection areas, on the left and right sides, respectively, of the vehicle, the detection areas (ZR0) without overlap being tangential to the offset of the front left and right wheels
(Continued)

(RA1, RA2) taking into account the maximum steering angle thereof.

6 Claims, 2 Drawing Sheets

(58) Field of Classification Search
USPC .................................................... 356/4.01
See application file for complete search history.

(56) References Cited

OTHER PUBLICATIONS

Written Opinion for PCT/FR2019/051458 dated Sep. 20, 2019.
Jo Kichun et al: "Development of Autonomous Car-Part II: A Case Study on the Implementation of an Autonomous Driving System Based on Distributed Architec"; IEEE , Transactions on Industrial Electronics, IEEE Service Center, Piscataway, NJ, USA, vol. 62, No. 8, Aug. 1, 2015 (Aug. 1, 2015), pp. 5119-5132, XP011585875, ISSN: 0278-0046, DOI: 10.1109/TIE.2015.2410258.

MOTOR VEHICLE PROVIDED WITH ANTI-COLLISION SENSORS

CROSS-REFERENCE TO RELATED APPLICATIONS

This application is the US National Stage under 35 USC § 371 of International Application No. PCT/FR2019/051458, filed 17 Jun. 2019 which claims priority to French Application No. 1855424 filed 20 Jun. 2018 both of which are incorporated herein by reference.

BACKGROUND

The present invention relates generally to anti-collision sensors and relates more particularly to the installation of these sensors in vehicles having autonomous driving capabilities, and in particular to an autonomous shuttle.

Installing sensors on a motor vehicle in order to detect the imminence of a collision with another vehicle or part of an infrastructure is known.

The sensors most often used in the automotive field include in particular anti-collision lidars. These lidars are respectively arranged on the four corners of the motor vehicle.

A lidar, which is an acronym meaning "light (or laser) detecting and ranging," is an optoelectronic system comprising a laser beam emitter, a receiver comprising a light collector and a photo detector which transforms light into an electrical signal, as well as an electronic signal processing chain which extracts the information sought.

Such sensors use a laser beam to determine the distance which separates them from the objects present in the area surrounding the carrier vehicle (i.e., the vehicle provided with, or the "carrier" of, the sensors). The sensors make it possible to detect dangerous obstacles near the carrier vehicle. They are part of the start of the safety chain to trigger emergency braking in the event that a dangerous obstacle is very close to the carrier vehicle.

They are also used to allow smoother, progressive decelerations when obstacles considered dangerous are perceived on the trajectory of the carrier vehicle sufficiently in advance.

SUMMARY

The embodiment described herein more particularly considers LMS-151 type lidars which are marketed by the company SICK, and which are arranged on the four corners of the carrier vehicle, generally at 300 mm from the ground.

These sensors make it possible to comply with a certain number of constraints, including:
- the vertical opening angle, considered to be centered with respect to the horizontal median plane of the sensor, is 1°;
- the horizontal opening angle, considered to be in the median plane of the sensor and the origin of which corresponds to the physical center of the sensor, is 270°;
- the detection plane of the sensors is parallel to the road;
- the sensors are positioned outside the "perimeter" of the vehicle (i.e., outside the maximum dimensions of the vehicle body in order to scan the front and sides of the vehicle). This implies that the "physical" center of each sensor is clear of the sides of the vehicle (and ideally from the offset of the front wheels when they are steered) by a minimum of 2 cm; and
- the detection surfaces (or detection areas) overlap to create redundancy areas in order to compensate for the failure of a sensor.

Compliance with these constraints requires the sensors to be placed outside the perimeter of the vehicle: they therefore protrude beyond the maximum dimensions of the vehicle. The sensors are thus said to be "offset" from the perimeter of the vehicle.

Such protrusions or offsets are potentially dangerous and are therefore not acceptable for a motor vehicle which has to travel essentially in a pedestrian environment as is the case, in particular, for an autonomous shuttle which has to move within an industrial site or an urban space with a high pedestrian concentration. Moreover, the sensors are naturally more exposed to breakage in the event of a collision with obstacles.

The aim thus is, in particular, to find a compromise in the installation of the sensors on the vehicle that makes it possible to ensure both obstacle detection, which is vital for the safety of pedestrians, and a reduced protrusion of the sensors with respect to the perimeter of the vehicle, to reduce the risk of material breakage.

To this end, a motor vehicle is disclosed which is provided with at least four identical lidar-type anti-collision sensors arranged, respectively, on the four corners of the vehicle, each sensor having the same predetermined opening angle and defining at least one detection area around the vehicle, certain detection areas being able to overlap in order to create redundancy. The two left and right front sensors are positioned and oriented such that their detection areas are tangential to the offset of the front left and right wheels, respectively, taking into account the maximum steering angle of the front left and right wheels. The two rear left and right sensors define detection areas, without overlap with other detection areas, on the left and right sides, respectively, of the vehicle, the detection areas without overlap being tangential to the offset of the front left and right wheels taking into account the maximum steering angle thereof.

According to one feature, the front left and right sensors are positioned at the front of the vehicle such that their centers are set back from the left and right sides, respectively, of the vehicle, toward the longitudinal axis of the vehicle.

According to another feature, the left and right rear sensors are positioned at the rear of the vehicle such that their centers are on the edge of the perimeter of the vehicle.

According to other features, the perimeter of the vehicle has, viewed from above, a generally rectangular shape, the rear left and right sensors being positioned at the corners of the rectangle corresponding to the rear left and right corners of the vehicle, and the front left and right sensors being positioned at a distance from the other two corners of the rectangle so as to face each other.

According to yet another feature, there is no lateral projection of the sensors with respect to the perimeter of the vehicle when the left and right exterior mirrors are deployed.

According to another feature, the vehicle as described above is an autonomous shuttle.

DESCRIPTION OF THE FIGURES

The invention will be better understood, and other aims, features, details and advantages thereof will become clearer in the explanatory description which follows, with reference to the accompanying drawings which are provided solely as an example of an embodiment of the invention and in which.

In the drawings, identical elements are denoted by the same reference signs.

The vehicle is shown in a two-dimensional XY coordinate system.

DETAILED DESCRIPTION

Figure 1:
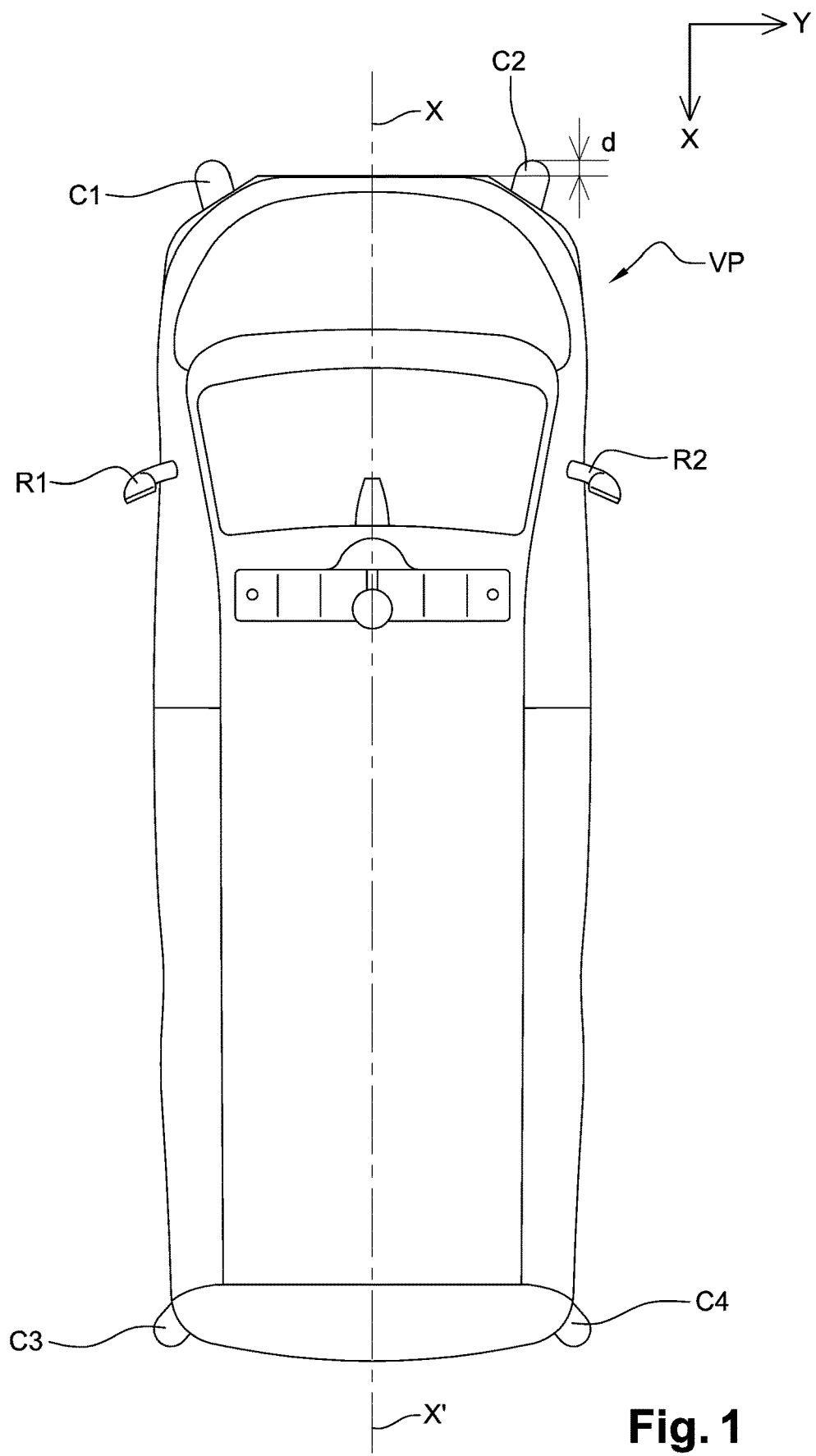
FIG. 1 is a top view of a vehicle showing the installation of four lidar-type angle sensors.

FIG. 1 illustrates a carrier vehicle VP seen from above, the vehicle being, for example, a standard light commercial vehicle such as a Citroen Jumpy or Peugeot Expert or their passenger car versions, Space Tourer and Traveler, respectively.

The sensors C1 to C4 are installed on the four corners of the carrier vehicle VP, the general shape of which, viewed from above, may resemble a rectangle.

In the installation of the sensors, the offset d of the front left and right sensors C1 and C2 is only 60 mm in the front area of the carrier vehicle VP and there is no or almost no lateral projection of the sensors C1 to C4 with respect to the perimeter of the carrier vehicle VP with the left and right exterior mirrors R1 and R2 deployed.

The sensors C1 to C4 are identical lidars of the aforementioned LMS-151 type lidar sensors.

Figure 2:
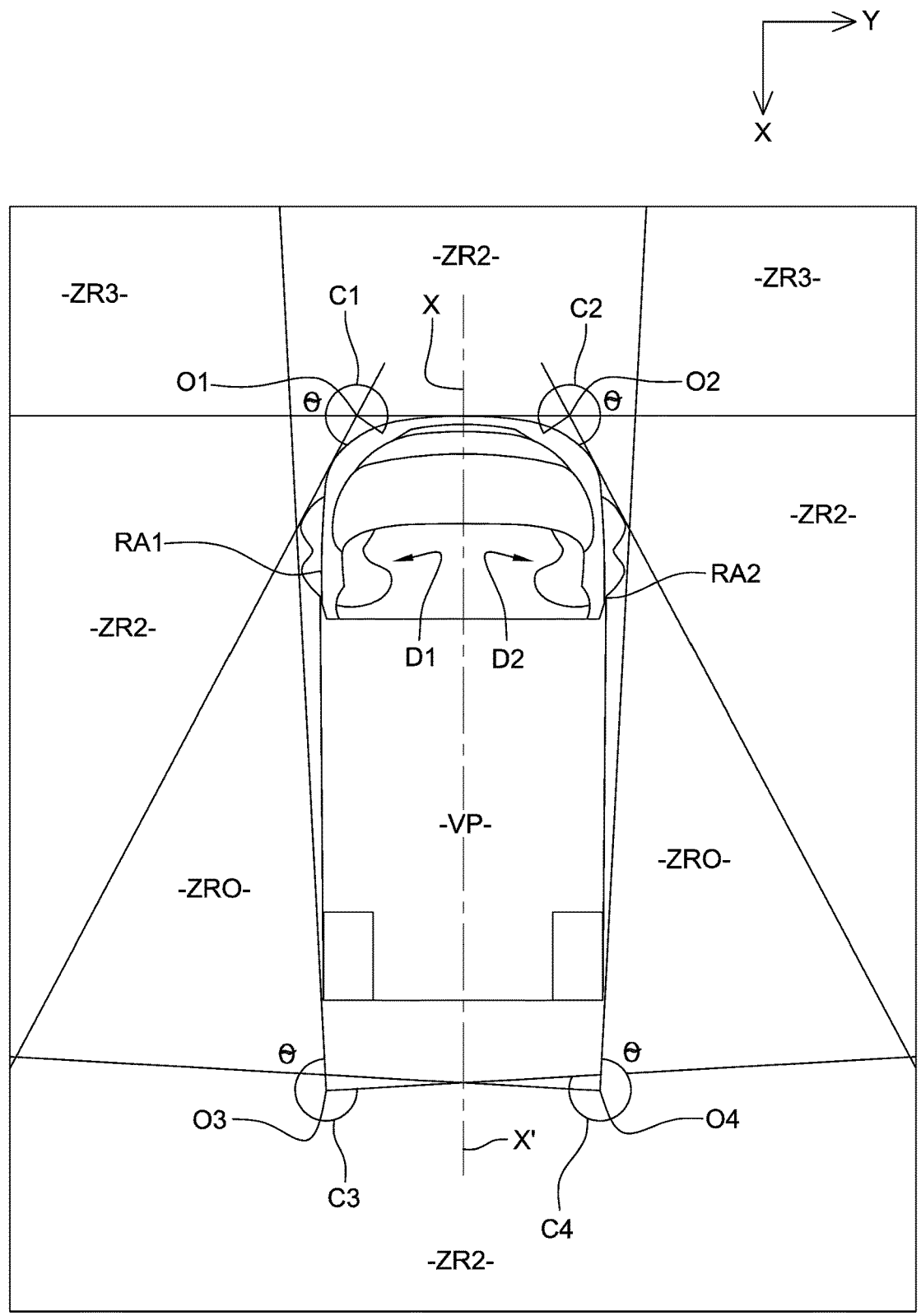
FIG. 2 is the same top view as FIG. 1 and showing detection areas scanned by the four angle sensors.

With reference to FIG. 2, the sensors C1 to C4 are installed so that their horizontal opening angles cover at least the entire surroundings close to the carrier vehicle VP with detection areas, some of which may overlap. Such overlap areas are also called "redundancy areas." These redundancy areas, which are vital for compensating for the failures of one of the sensors C1 to C4, can be double overlap areas ZR2 (overlap of detection areas scanned by two sensors) or even triple overlap areas ZR3 (overlap of detection areas scanned by three sensors).

To limit an excessively large offset of the sensors C1 to C4 with respect to the perimeter of the carrier vehicle VP, redundancy for certain detection areas is not really necessary. This is particularly the case for the zero overlap areas ZR0 corresponding to the left and right sides of the carrier vehicle VP.

In the event of failure of a sensor C1 to C4, the carrier vehicle VP is programmed to stop. Thus, on the left and right sides of the carrier vehicle VP, simple detection without redundancy (ZR0) is acceptable.

To meet the constraints mentioned above together with the conditions on redundancy, the front left and right sensors C1 and C2 of the front left and right corners, respectively, are installed on the carrier vehicle VP by being closer to the front face of the vehicle and the center of the carrier vehicle VP and so as to have predetermined precise orientation of their opening angle.

The orientation of the sensors C1 to C4 is determined such that their detection areas are tangential to the displacement D1 and D2 of the left and right front wheels RA1 and RA2 steered at their maximum steering angle.

As indicated previously, the sensors C1 to C4 have a horizontal opening angle θ of 270° and a vertical opening angle of 1°. The front left and right sensors C1 and C2 are fixed at a height from the ground of 23 cm or 30 cm and the rear left and right sensors C3 and C4 at a height of 30 cm.

Each sensor C1 to C4 is represented by a sector of a circle of 270° having a center O1 to O4, symbolizing the horizontal opening angle θ of each sensor C1 to C4. The centers O1 to O4 coincide with the "physical" centers of the sensors C1 to C4.

The centers O1 and O2 of the front left and right sensors C1 and C2 are aligned and tangential to the front face of the carrier vehicle VP which extends along the Y axis, perpendicularly to the longitudinal axis XX' of the carrier vehicle VP.

With the sensors C1 to C4 installed in this way, the opening angles θ of the sensors C1 to C4 define detection areas around the carrier vehicle VP, some of which at least partially overlap once (ZR2) or twice (ZR3), thus creating redundancies in the information delivered by the sensors C1 to C4.

The sensors C1 and C2 contribute to the definition of five detection areas around the carrier vehicle VP: two triple redundancy areas ZR3 corresponding to the front left and right areas, respectively, of the carrier vehicle VP, and a first double redundancy area ZR2 corresponding to the front area of the carrier vehicle between the two triple redundancy areas ZR3.

The sensor C1 also contributes, together with the sensor C3, to the definition of a second double redundancy area ZR2 and the sensor C2 also contributes, together with the sensor C4, to the definition of a third double redundancy area ZR2.

The sensors C3 and C4 define first and second areas ZR0 without redundancy on the left and right sides of the carrier vehicle VP, respectively. These sensors also contribute to the definition of a fourth double redundancy area ZR2 that extends to the rear of the carrier vehicle VP.

The invention claimed is:

1. A motor vehicle provided with at least four identical lidar-type anti-collision sensors respectively arranged on the four corners of the vehicle (VP), the four sensors defining a front right sensor, a front left sensor, a rear right sensor and a rear left sensor, each sensor (C1 to C4) having a same predetermined opening angle (θ) and defining at least one detection area around the vehicle (VP), the detection areas (ZR2, ZR3) of certain sensors overlapping in order to create redundancy, wherein the front left and front right sensors (C1 and C2) are positioned and oriented such that the detection areas thereof are tangential to the offset (D1, D2) of front left and right wheels (RA1, RA2), respectively, of the vehicle taking into account maximum steering angles of the front left and right wheels (RA1, RA2), and in that wherein the rear left sensor and rear right sensor define zero overlap detection areas that do not overlap with other detection areas on the left and right sides, respectively, of the vehicle (VP), the zero overlap detection areas being tangential to the offset of the front left and right wheels (RA1, RA2) taking into account the maximum steering angle thereof.

2. The vehicle according to claim 1, wherein the front left sensor and right sensor are positioned at a front of the vehicle such that centers of said front left sensor and front right sensor are set back from left and right sides, respectively, of the vehicle, toward a longitudinal axis (XX') of the vehicle.

3. The vehicle according to claim 1, wherein the rear left sensor and rear right sensor are positioned at a rear of the vehicle such that centers of the rear left and rear right sensors are on an edge of the perimeter of the vehicle (VP).

4. The vehicle according to claim 3, wherein the perimeter of the vehicle has, viewed from above, a generally rectangular shape and in that the rear left and rear right sensors are positioned at corners of a rectangle corresponding to rear left and right corners of the vehicle, and wherein that the front left and front right sensors are positioned at a distance from the other two corners of the rectangle so as to face each other.

5. The vehicle according to claim 4, wherein none of the sensors project laterally with respect to the perimeter of the vehicle with the left and right exterior mirrors (R1 and R2) deployed.

6. The vehicle according to claim 1, wherein said vehicle is an autonomous shuttle.

* * * * *